United States Patent
Quartiroli et al.

(10) Patent No.: US 12,301,341 B2
(45) Date of Patent: *May 13, 2025

(54) TIME DIVISION MULTIPLEXING HUB

(71) Applicant: STMICROELECTRONICS S.R.L., Agrate Brianza (IT)

(72) Inventors: Matteo Quartiroli, Certosa di Pavia (IT); Alessandra Maria Rizzo Piazza Roncoroni, Abbiategrasso (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,117

(22) Filed: Feb. 15, 2024

(65) Prior Publication Data

US 2024/0195521 A1 Jun. 13, 2024

Related U.S. Application Data

(63) Continuation of application No. 17/898,335, filed on Aug. 29, 2022, now Pat. No. 11,949,500.

(51) Int. Cl.
*H04J 3/06* (2006.01)
(52) U.S. Cl.
CPC .......... *H04J 3/0685* (2013.01); *H04J 3/0617* (2013.01)
(58) Field of Classification Search
CPC .. G06Q 10/0835; G06Q 20/40; G06Q 20/308; G06Q 10/08355; G06Q 30/0267; G06Q 10/083; G06Q 10/0836; G06Q 10/087; G06Q 10/0833; G06Q 20/321; H04H 20/61; H04H 20/71; H04W 24/10; H04W 8/18; H04W 12/06; H04W 12/08; H04W 64/00; H04L 67/12; H04L 65/403; H04L 67/52; H04L 41/0813; G05D 1/0088; G05D 1/0022; G08B 21/0261

See application file for complete search history.

(56) References Cited

U.S. PATENT DOCUMENTS

| | | |
|---|---|---|
| 6,404,780 B1 | 6/2002 | Laturell et al. |
| 7,103,460 B1 | 9/2006 | Breed |
| 7,830,906 B2 | 11/2010 | Satoh et al. |

(Continued)

FOREIGN PATENT DOCUMENTS

| | | |
|---|---|---|
| CN | 102465834 A | 5/2012 |
| EP | 2854325 A1 | 4/2015 |

(Continued)

*Primary Examiner* — Jung Liu
(74) *Attorney, Agent, or Firm* — Seed IP Law Group LLP

(57) ABSTRACT

An integrated circuit includes a control circuit, a primary sensor device coupled to the control circuit, and a plurality of groups of secondary sensor devices coupled to the primary sensor device. The primary sensor device receives a master clock signal from the control device and outputs, to each group of secondary sensor devices, a respective secondary clock signal with a frequency lower than the primary clock signal. The primary sensor device generates primary sensor data. The primary sensor device receives secondary sensor data from each group of secondary sensor devices. The primary sensor device combines the primary sensor data and all of the secondary sensor data into a sensor data stream with a time division-multiplexing scheme and outputs the sensor data stream to the control circuit.

20 Claims, 10 Drawing Sheets

(56) References Cited

U.S. PATENT DOCUMENTS

| | | |
|---|---|---|
| 8,310,380 B2 | 11/2012 | Aria et al. |
| 8,433,838 B2 | 4/2013 | Crockett et al. |
| 8,619,821 B2 | 12/2013 | Pan et al. |
| 9,762,289 B2 | 9/2017 | Henry et al. |
| 10,129,339 B1 | 11/2018 | Boerrigter et al. |
| 10,397,021 B2 | 8/2019 | Kessler et al. |
| 10,675,507 B2 | 6/2020 | Cusey et al. |
| 2006/0022869 A1 | 2/2006 | Zimmerman et al. |
| 2006/0022873 A1 | 2/2006 | Zimmerman |
| 2006/0023678 A1* | 2/2006 | Twitchell .............. H04W 84/18 370/338 |
| 2007/0179761 A1* | 8/2007 | Wren .................... G06V 20/52 703/2 |
| 2009/0115658 A1 | 5/2009 | Zimmerman et al. |
| 2012/0008787 A1* | 1/2012 | Wan ..................... H04L 9/0825 380/285 |
| 2012/0272089 A1 | 10/2012 | Hatfield et al. |
| 2013/0322461 A1 | 12/2013 | Poulsen |
| 2014/0047242 A1* | 2/2014 | Ukil ....................... H04L 9/083 713/171 |
| 2014/0254431 A1 | 9/2014 | Yan et al. |
| 2014/0297911 A1 | 10/2014 | Kossira et al. |
| 2016/0012390 A1* | 1/2016 | Skaaksrud ............... G05D 1/81 705/332 |
| 2017/0222829 A1 | 8/2017 | Kessler et al. |
| 2017/0300452 A1 | 10/2017 | Leo et al. |
| 2019/0041843 A1* | 2/2019 | Cella .................... G01M 13/045 |
| 2019/0124235 A1 | 4/2019 | Mitsubayashi et al. |
| 2019/0129405 A1* | 5/2019 | Cella ...................... H04B 17/23 |
| 2019/0349433 A1* | 11/2019 | Smith ................. H04L 61/4505 |
| 2020/0233397 A1 | 7/2020 | Bello et al. |
| 2022/0345525 A1 | 10/2022 | Rizzo Piazza Roncoroni et al. |
| 2023/0370524 A1 | 11/2023 | Rizzo Piazza Roncoroni et al. |

FOREIGN PATENT DOCUMENTS

| | | |
|---|---|---|
| WO | WO 2012134930 A1 | 10/2012 |
| WO | WO 2017062084 A1 | 4/2017 |

* cited by examiner

TIME DIVISION MULTIPLEXING HUB

BACKGROUND

Technical Field

The present disclosure is related to sensor systems, and more particularly, to sensor systems that include a plurality of sensors.

Description of the Related Art

A sensor system may include a large number of individual sensors. Each sensor may output sensor data. A control circuit may receive the sensor data from each of the sensors. The control circuit may utilize the individual sensor data in order to generate overall sensor data or otherwise utilize the sensor signals to perform some other function.

It can be difficult to deliver the sensor data from each of the sensors to the control circuit in a manner that the control circuit can properly process the sensor data. One possible solution is to utilize time division multiplexing. Time division multiplexing allows multiple channels of data to be transmitted on a single data line. In time division multiplexing, each data source (i.e. each individual sensor) is assigned a time window within a specified timing frame. The timing frame corresponds to a selected number of clock cycles. The time window of each data source is a particular subset of the clock cycles of the timing frame.

While time division multiplexing can be an effective solution, there also serious difficulties associated with time division multiplexing. In particular, large numbers of data sources each with high data rates can lead to very high clock frequencies in order to enable data transmission. This can result in hard timing constraints for the sensors. Furthermore, very high frequencies rates can lead to high power consumption and difficulties in achieving electromagnetic compatibility.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which, in and of itself, may also be inventive.

BRIEF SUMMARY

Embodiments of the present disclosure provide a sensor system including a plurality of sensor devices and a control circuit operating in a time division multiplexing scheme. One of the sensor devices acts as a primary sensor device coupled directly to the control circuit. The remaining sensor devices are arranged in multiple groups of secondary sensor devices each connected to the primary sensor device. Each group provides sensor data to the primary sensor device in separate time division multiplexing schemes. The primary sensor device collects the sensor data from each group of secondary sensor devices and provides the sensor data from all of the secondary sensor devices and the sensor data from the primary sensor device in a single time division multiplexing arrangement to the control circuit.

The use of a primary sensor device and multiple groups of secondary sensor devices provides various benefits. The separate time division multiplexing schemes enable the use of low clock frequencies between the primary sensor device and the groups of secondary sensor devices. This results in lower power consumption and more relaxed timing constraints. Accordingly, the efficiency and reliability of the sensor system is improved.

While the present disclosure primarily describes the use of sensor devices in a time division multiplexing scheme, principles of the present disclosure can extend to other types of systems that include multiple data sources. Accordingly, principles of the present disclosure extend generally to systems that include multiple data sources that each output data to be aggregated in a time division multiplexing scheme.

In one embodiment, a system includes a plurality of secondary sensor devices each configured to generate secondary sensor data. The system includes a primary sensor device coupled to each of the secondary sensor devices and configured to generate primary sensor data, to receive the secondary sensor data from each of the plurality of secondary sensor devices, and to output a data stream including the primary sensor data and the secondary sensor data from each secondary sensor device. The system includes a control device coupled to the primary sensor device and configured to receive the data stream from the primary sensor.

In one embodiment, a system includes a first secondary sensor device including a first secondary slave circuit and a second secondary sensor device including a second secondary slave circuit. The system includes a primary sensor device including a first secondary master circuit coupled to the first secondary slave circuit, a second secondary master circuit coupled to the second secondary slave circuit, and a primary slave circuit. The system includes a control device including a primary master circuit coupled to the primary slave circuit and the first and second secondary master circuits.

In one embodiment, a method includes generating primary sensor data with a primary sensor device, generating first secondary sensor data with a first secondary device, and generating second secondary sensor data with a second secondary sensor of a second secondary sensor device. The method includes controlling the primary sensor device with a primary master circuit of a control device coupled to the primary sensor device, controlling the first secondary sensor with a first secondary master circuit of the primary sensor device, and controlling the second secondary sensor with a second secondary master circuit of the primary sensor device.

In one embodiment, a method includes receiving, at a primary sensor device, a primary clock signal from a control device, generating, at the primary sensor device, a first secondary clock signal having a frequency lower than a frequency of the primary clock signal, and generating, at the primary sensor device, a second secondary clock signal having a frequency lower than the frequency of the primary clock signal. The method includes outputting first secondary sensor data from a first secondary sensor device to the primary sensor device in accordance with the first secondary clock signal and outputting second secondary sensor data from a second secondary sensor device to the primary sensor device in accordance with the second secondary clock signal. The method includes outputting, from the primary sensor device to the control device, a data stream including the first secondary sensor data, the second secondary sensor data, and the primary sensor data in accordance with the primary clock signal.

OF THE SEVERAL VIEWS OF THE DRAWINGS

Reference will now be made by way of example only to the accompanying drawings. In the drawings, identical reference numbers identify similar elements or acts. In some drawings, however, different reference numbers may be used to indicate the same or similar elements. The sizes and relative positions of elements in the drawings are not necessarily drawn to scale. For example, the shapes of various elements and angles are not necessarily drawn to scale, and some of these elements may be enlarged and positioned to improve drawing legibility.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known systems, components, and circuitry associated with integrated circuits have not been shown or described in detail, to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to." Further, the terms "first," "second," and similar indicators of sequence are to be construed as interchangeable unless the context clearly dictates otherwise.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

Figure 1:
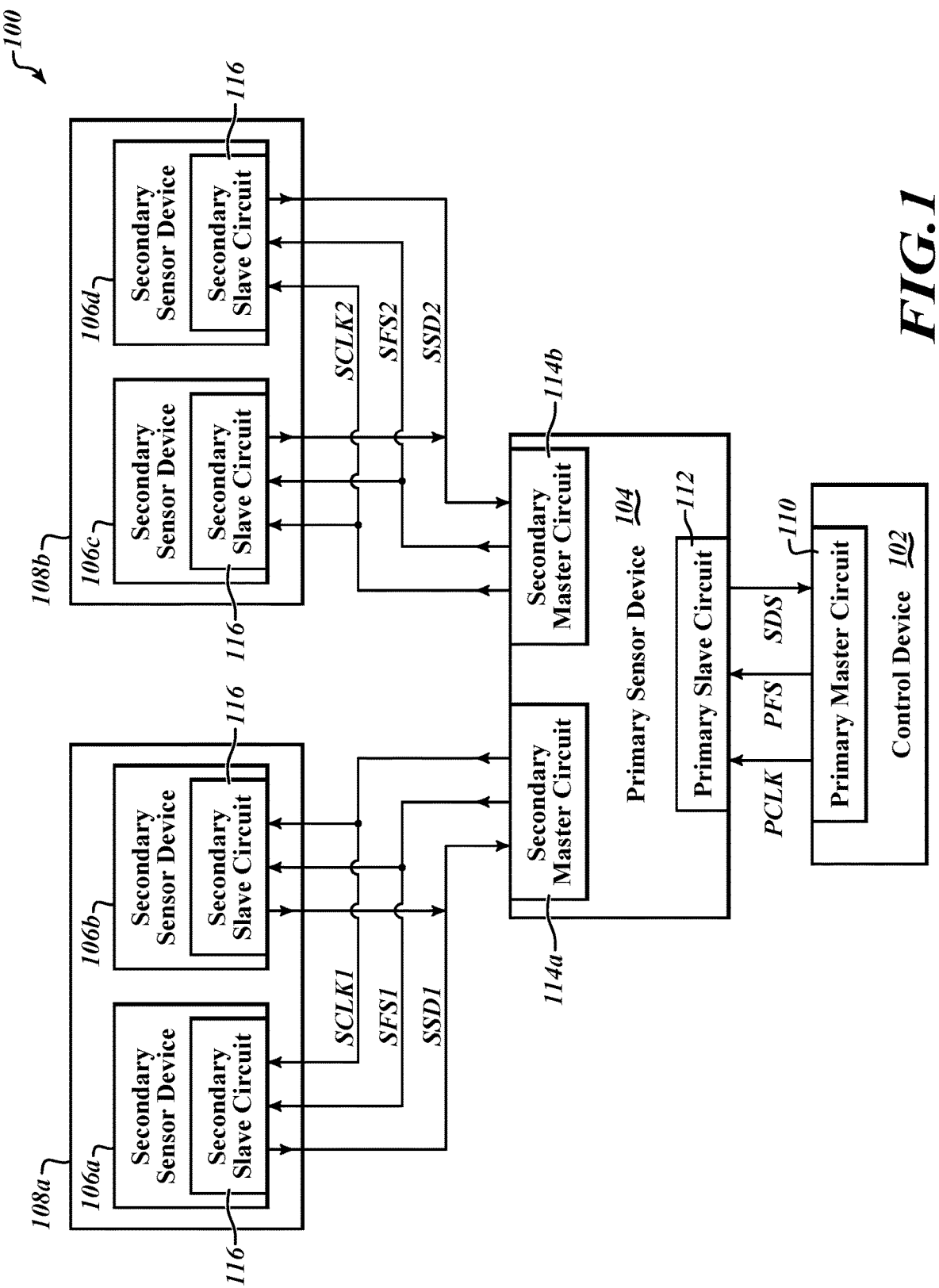
FIG. 1 is a block diagram of a sensor system, according to one embodiment.

FIG. 1 is a block diagram of a sensor system 100, according to one embodiment. The sensor system 100 includes a control device 102, a primary sensor device 104, and a plurality of secondary sensor devices 106a-106d. As will be set forth in more detail below, the arrangement and configuration of the primary sensor device 104 and the secondary sensor devices 106 enable a reliable and efficient data delivery system.

As used herein, the term "sensor device" may correspond to a device that includes a sensor and additional circuitry. The sensor generates sensor signals. The additional circuitry can include circuitry that generates sensor data from the sensor signals, circuitry that receives signals from one or more devices, and circuitry that sends signals to one or more devices.

The primary sensor device 104 and the secondary sensor devices 106 each include a respective physical sensor that senses a physical phenomenon and generates sensor signals. The primary sensor device 104 and the secondary sensor devices 106 each generate sensor data from the respective sensor signals. This can include performing signal processing operations on the sensor signals to convert analog sensor signals to digital sensor data. As used herein the term "primary sensor data" refers to sensor data generated by the primary sensor device 104. As used herein, the term "secondary sensor data" corresponds to sensor data generated by the secondary sensor devices 106.

The control device 102 is coupled to the primary sensor device 104. As will be set forth in more detail below, the control device 102 receives a data stream from the primary sensor device including the sensor data from the primary sensor device 104 and the secondary sensor devices 106 on a single data line. The sensor data from the various sensor devices is provided by the primary sensor device 104 to the control device 102 in a time division multiplexing scheme.

The control device 102 includes a primary master circuit 110. The primary master circuit 110 outputs a primary clock signal PCLK to the primary sensor device 104. The primary master circuit 110 outputs a primary frame signal PFS to the primary sensor device 104. The primary master circuit 110 receives from the primary sensor device 104 a sensor data stream SDS on a single data line.

The primary clock signal PCLK is a master clock signal for the entire sensor system 100. The primary clock signal PCLK has a relatively high frequency. The primary clock signal PCLK can have a frequency between 1 MHz and 5 GHz, though other frequencies can be utilized without departing from the scope of the present disclosure.

The primary frame signal PFS indicates the beginning of a frame. A frame corresponds to a number of cycles of the primary clock signal PCLK. The frame is further divided into a plurality of channels. Each channel corresponds to a number of cycles of the primary clock signal PCLK. Each channel is assigned to one of the sensor devices 104, 106. As an illustrative example, a frame may correspond to 20 cycles of the primary clock signal PCLK. There are five sensor devices (one primary sensor device 104 and four secondary sensor devices 106). Accordingly, the frame is divided into five channels. Each channel corresponds to four clock cycles of the 20 clock cycle frame. The first channel corresponds to the first four clock cycles of the frame and is assigned to the sensor data of the primary sensor device 104. The second channel corresponds to the second for clock cycles (cycles 5-8) of the frame and is assigned to the secondary sensor device 106*a*. The third channel corresponds to clock cycles 9-12 of the frame and is assigned to the secondary sensor device 106*b*. The fourth channel corresponds to clock cycles 13-16 of the frame and is assigned to the secondary sensor device 106*c*. The fifth channel corresponds to the clock cycles 17-20 of the frame and is assigned to the secondary sensor device 106*d*.

The sensor data stream SDS includes the sensor data from each of the sensor devices 104 and 106. At the beginning of a frame, the primary master circuit 110 receives the first four data values (bits of value 0 or 1) of the sensor data stream SDS as the sensor data from the primary sensor device 104. The primary master circuit 110 receives the next four data values as the sensor data from the secondary sensor device 106*a*, and so forth until the frame is complete and four data values have been received for each sensor device 104 and 106. A frame of 20 cycles and five channels of four cycles each is given by way of illustrative example. In practice, a frame can have different numbers of cycles and different numbers of channels, and channels can have different numbers of cycles without departing from the scope of the present disclosure.

The primary sensor device 104 includes a primary slave circuit 112. The primary slave circuit 112 receives the primary clock signal PCLK, the primary frame signal PFS, and provides the sensor data stream SDS to the primary master circuit 110. Accordingly, the primary slave circuit 112 acts as a slave to the primary master circuit 110 in that the primary master circuit provides the clock signal PCLK and the frame signal PFS to the primary slave circuit 112, while the primary slave circuit 112 provides the sensor data stream to the primary master circuit 110.

The primary sensor device 104 includes secondary master circuit 114*a* and a secondary master circuit 114*b*. The secondary master circuit 114*a* communicates with the secondary sensor devices 106*a* and 106*b* of the group 108*a*. In particular, the secondary master circuit 114*a* outputs a secondary clock signal SCLK1 and a secondary frame signal SFS1 to the secondary sensor devices 106*a* and 106*b*. The secondary master circuit 114*a* receives a secondary sensor data signal SSD1.

The secondary clock signal SCLK1 is a clock signal with a lower frequency than the primary clock signal PCLK. In one embodiment, the secondary clock signal SCLK1 has a frequency equal to the frequency of PCLK divided by the number of secondary master circuits 114 of the primary sensor device 104. In the example of FIG. 1, the frequency of SCLK1 may be equal to half the frequency of PCLK, though other frequencies can be utilized for SCLK1 without departing from the scope of the present disclosure.

The secondary frame signal SFS1 is a frame signal similar to the primary frame signal PFS. The secondary frame signal SFS1 indicates the beginning of a frame. The frame corresponds to a number of cycles of the secondary clock signal SCLK1. The frame is further divided into a plurality of channels. Each channel corresponds to a number of cycles of the secondary clock signal SCLK1. Each channel is assigned to one of the sensor 106*a* and 106*b*. As an illustrative example, a frame may correspond to 8 cycles of the secondary clock signal SCLK1. There are two secondary sensor devices in the group 108*a*. Accordingly, the first channel may correspond to the first four clock cycles of a SCLK1 and may be assigned to the secondary sensor device 106*a*. The remaining four clock cycles of the frame may correspond to the second channel and may be assigned to the secondary sensor device 106*b*. In some examples, the group 108*a* may include more than two secondary sensor devices 106 and the frame and configuration of channels may be different than described above. Additionally, in one embodiment, the secondary master circuit 114*a* is connected to only a single secondary sensor device 106. In this case, the entirety of the frame of SFS1 may be assigned to the single secondary sensor device 106.

Each secondary sensor device 106*a* includes a respective secondary slave circuit 116. The secondary slave circuits 116 of the group 108*a* each receive the secondary clock signal SCLK1 and the secondary frame signal SFS1 from the secondary master circuit 114*a*. The slave circuit 116 of the secondary sensor device 106*a* provides sensor data to SSD1 during the first channel of the frame defined by SFS1. The slave circuit 116 of the secondary sensor device 106*b* provides sensor data to SSD1 during the second channel of the frame defined by SFS1. The secondary master circuit 114*a* receives the sensor data from the secondary sensor devices of the group 108*a* and the secondary sensor data stream SSD1 in a time division multiplexing scheme.

The secondary master circuit 114*b* communicates with the secondary sensor devices 106*c* and 106*d* of the group 108*d*. In particular, the secondary master circuit 114*b* outputs a secondary clock signal SCLK2 and a secondary frame signal SFS2 to the secondary sensor devices 106*c* and 106*d*. The secondary master circuit 114*b* receives a secondary sensor data signal SSD2.

The secondary clock signal SCLK2 is a clock signal with a lower frequency than the primary clock signal PCLK. In one embodiment, the secondary clock signal SCLK2 has a frequency equal to the frequency of PCLK divided by the number of secondary master circuits 114 of the primary sensor device 104. In the example of FIG. 1, the frequency of SCLK2 may be equal to half the frequency of PCLK, though other frequencies can be utilized for SCLK2 without departing from the scope of the present disclosure. The frequency of the secondary clock signal SCLK2 may be identical to the frequency of the secondary clock signal of SCLK1.

The secondary frame signal SFS2 is a frame signal similar to the primary frame signal PFS. The secondary frame signal SFS2 indicates the beginning of a frame for the group 108*b*. The frame corresponds to a number of cycles of the secondary clock signal SCLK2. The frame is further divided into a plurality of channels. Each channel corresponds to a number of cycles of the secondary clock signal SCLK2. Each channel is assigned to one of the sensor 106*c* and 106*d*. As an illustrative example, a frame may correspond to 8 cycles of the secondary clock signal SCLK2. There are two secondary sensor devices in the group 108*b*. Accordingly, the first channel may correspond to the first four clock cycles of SCLK2 and may be assigned to the secondary sensor device 106*c*. The remaining four clock cycles of the frame may correspond to the second channel and may be assigned to the secondary sensor device 106*d*. In some examples, the group 108*b* may include more than two secondary sensor devices 106 and the frame and configuration of channels may be different than described above. Additionally, in one embodiment, the secondary master circuit 114*b* is connected to only a single secondary sensor device 106. In this case, the entirety of the frame of SFS2 may be assigned to the single secondary sensor device 106.

Each secondary sensor device 106 includes a respective secondary slave circuit 116. The secondary slave circuits 116 of the group 108*b* each receive the secondary clock signal SCLK2 and the secondary frame signal SFS2 from the secondary master circuit 114*b*. The slave circuit 116 of the secondary sensor device 106*c* provides sensor data to SSD2 during the first channel of the frame defined by SFS2. The slave circuit 116 of the secondary sensor device 106*d* provides sensor data to SSD1 during the second channel of the frame defined by SFS2. The secondary master circuit 114*b* receives the sensor data from the secondary sensor devices of the group 108*b* in the secondary sensor data stream SSD2 in a time division multiplexing scheme.

The primary slave circuit 112 receives SSD1 from the secondary master circuit 114*a* and SSD2 from the secondary master circuit 114*b*. The primary slave circuit 112 utilizes time division multiplexing to combine the sensor data from SSD1 and SSD2 with the sensor data generated by the primary sensor device 104 and provides the sensor data stream SDS to the primary master circuit 110 of the control device 102, as described previously.

Though not shown in FIG. 1, the primary slave circuit 112 may provide the signals PCLK and PFS to both of the secondary master circuits 114*a* and 114*b*. The secondary master circuits may generate SCLK1 and SCLK2 based on PCLK. The secondary master circuits 114*a* and 114*b* may generate SFS1 and SFS2 based on PFS. Furthermore, secondary master circuits 114*a* and 114*b* may include overlapping circuitry with each other and with the primary slave circuit 112.

Figure 2:
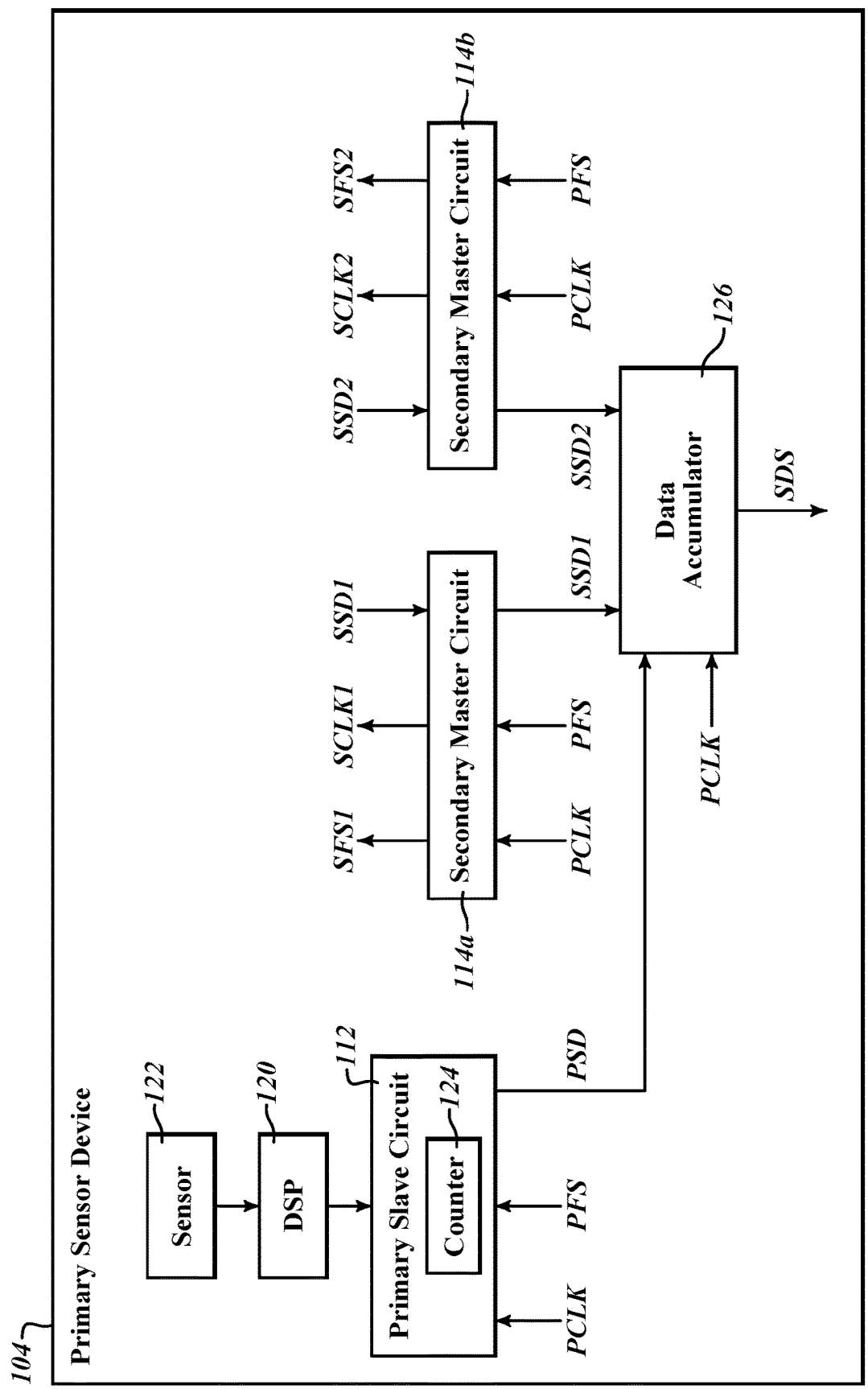
FIG. 2 is a block diagram of a primary sensor device, according to one embodiment.

FIG. 2 is a block diagram of a primary sensor device 104, in accordance with one embodiment. The primary sensor device 104 of FIG. 2 is one example of a primary sensor device 104 of FIG. 1.

The primary sensor device 104 includes a sensor 122. The sensor 122 can generate sensor signals indicative of a physical phenomenon being sensed. The sensor 122 can include a light sensor, a vibration sensor, an audio sensor, an inertial sensor, a voltage sensor, a current sensor, a temperature sensor, or other types of sensors. The sensor 122 outputs sensor signals indicative of the particular physical phenomenon being sensed. The sensor signals may initially be unprocessed analog sensor signals. Alternatively, sensor 122 can generate other types of sensor signals.

In one embodiment, the sensor 122 is an inertial sensor including one or both of an accelerometer and a gyroscope. The sensor 122 may include one or both of a three-axis accelerometer and a three-axis gyroscope. Accordingly, the sensor signals may include voltage or current signals indicative of acceleration and rotation on the various axes.

The primary sensor device 104 includes a digital signal processor 120. The digital signal processor 120 may receive the sensor signals from the sensor 122 and may generate sensor data from the sensor signals. This can include converting analog sensor signals to digital sensor data. The digital signal processor 120 may include various types of circuitry that condition and otherwise process the sensor data.

The primary sensor device 104 includes a primary slave circuit 112. The primary slave circuit 112 receives the signals PCLK and PFS from the primary master circuit 110, as described in relation to FIG. 1. The primary slave circuit 112 receives the primary sensor data sensor data from the DSP 120 and outputs the primary sensor data PSD.

The primary slave circuit 112 may include a counter 124. The counter 124 counts the number of cycles of the CLK. In one embodiment, the rising edge of PFS indicates the beginning of a frame. Upon receiving the rising edge of PFS, the counter begins counting cycles of PCLK. The primary slave circuit 112 may also include a memory register stores configuration data for the primary slave circuit 112. The configuration data may indicate which cycles of the frame are allocated to the channel corresponding to the primary sensor data PSD. The primary slave circuit 112 may then output the primary sensor data on the clock cycles of PCLK assigned to the channel of the sensor 122 of the primary sensor device 104.

The primary sensor device 104 includes the secondary master circuits 114*a* and 114*b*. The secondary master circuits 114*a* and 114*b* receive PCLK and PFS and output SFS1 and SCLK1 as described in relation to FIG. 1. The secondary master circuit 114*a* receives the secondary sensor data SSD1 and outputs the secondary sensor data SSD1. The secondary master circuit 114*b* outputs SCLK2 and SFS2 and receives SSD2 and outputs SSD2.

In one embodiment, the primary sensor device 104 includes a data accumulator 126. Although the data accumulator 126 is shown as separate from the primary slave circuit 112, the data accumulator 126 may be part of the primary slave circuit 112. The data accumulator 126 receives the signals PSD, SSD1, and SSD2, as well as PCLK. The data accumulator 126 generates the sensor data stream SDS and outputs the sensor data stream SDS to the primary master circuit 110.

Figure 3:
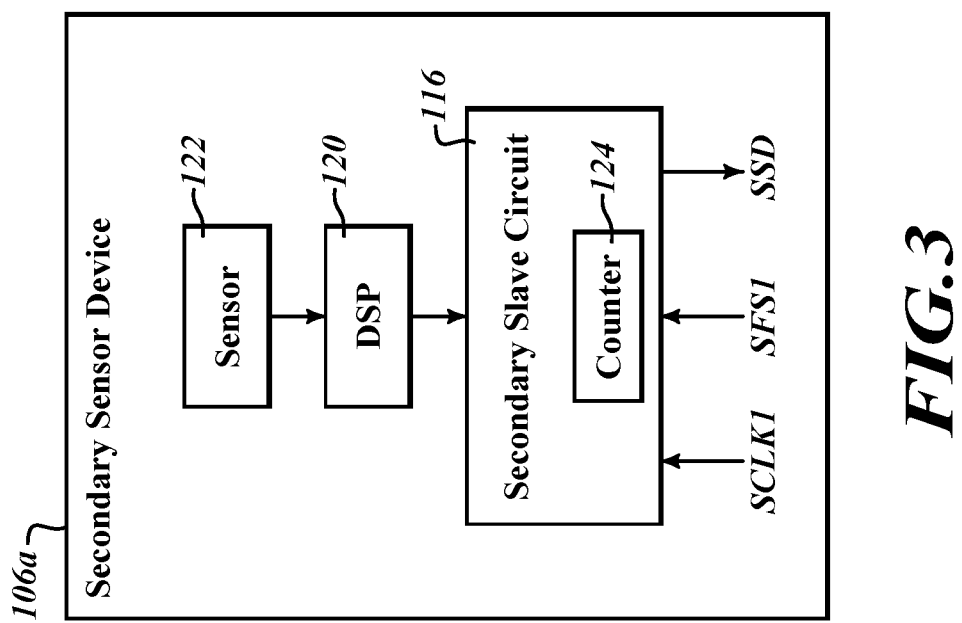
FIG. 3 is a block diagram of a secondary sensor device, according to one embodiment.

FIG. 3 is a block diagram of a secondary sensor device 106*a*, according to one embodiment. The secondary sensor device 106*a* is one example of a secondary sensor device 106*a* of FIG. 1. Additional secondary sensor devices may be substantially identical to the secondary sensor device 106*a*. The secondary sensor device 106*a* includes a sensor 122. The sensor 122 can generate sensor signals indicative of a physical phenomenon being sensed. The sensor 122 can be a type of sensor described in relation to the sensor 122 of the primary sensor device 104 of FIG. 2. In one embodiment, all of the sensors 122 of the sensor devices 104 and 106 are a same type of sensor.

The secondary sensor device 106*a* includes a digital signal processor 120. The digital signal processor 120 may receive sensor signals from the sensor 122 and generate sensor data substantially as described in relation to the digital signal processor 120 of the primary sensor device 104 of FIG. 2.

The secondary sensor device 106*a* includes a secondary slave circuit 116. The secondary slave circuit 116 receives the signals SCLK1 and SFS1 from the secondary master circuit 114*a*, as described in relation to FIG. 1. The secondary slave circuit 112 may include a counter 124. The counter 124 counts the number of cycles of SCLK1. In one embodiment, the rising edge of SFS1 indicates the beginning of a frame. Upon receiving the rising edge of SFS1, the counter 124 begins counting cycles of SCLK1. The secondary slave circuit 116 may also include a memory or register that stores configuration data for the secondary slave circuit 116. The configuration data may indicate which cycles of the frame are allocated to the channel corresponding to the secondary sensor device 106*a*. The secondary slave circuit 116 may then output the secondary sensor data SSD on the clock cycles of SCLK1 assigned to the channel of the sensor 122 of secondary sensor device 106*a*. Each secondary slave circuit of the group 108*a* outputs secondary sensor data SSD in a time division multiplexing scheme to combine as SSD1. Each secondary slave circuit of the group 108B outputs secondary sensor data SSD in a time division multiplexing scheme to combine as SSD2.

Figure 4:
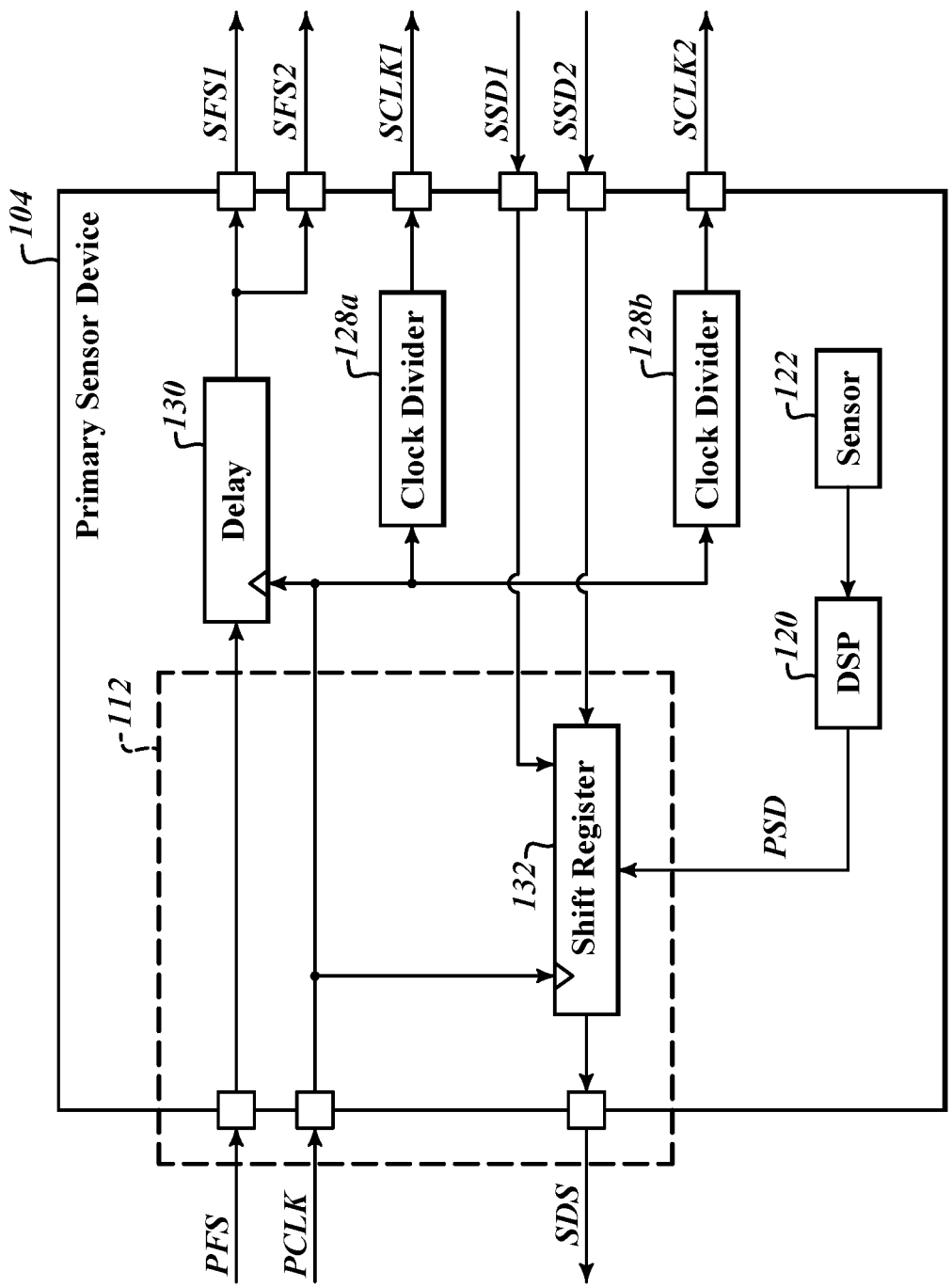
FIG. 4 is a schematic diagram of a primary sensor device, according to one embodiment.

FIG. 4 is a schematic diagram of a primary sensor device 104, in accordance with one embodiment. The primary sensor device 104 is one example of a primary sensor device 104 of FIG. 1. The 104 includes input terminals that receive PFS, PCLK, SSD1, and SSD2. The primary sensor device 104 includes output terminals that provide SDS, SFS1, SCLK1, SFS2, and SCLK2.

In one embodiment, the primary sensor device 104 includes a delay circuit 130. The delay circuit 130 receives the primary frame signal PFS and generates the secondary frame signals SFS1 and SFS2. In this example, the secondary frame signals SFS1 and SFS2 are identical and correspond to the primary frame signal PFS delayed by a selected number of clock cycles of PCLK.

The primary sensor device 104 includes a first clock divider 128a and the second clock divider 128b. The clock divider 128a receives the primary clock signal PCLK and generates the secondary clock signal SCLK1 by dividing the frequency of the primary clock signal PCLK in accordance with a selected division ratio. The clock divider 128b receives the primary clock signal PCLK and generates the secondary clock signal SCLK2 by dividing the frequency of the primary clock signal PCLK in accordance with a selected division ratio.

In one embodiment, the clock divider 128a, the delay circuit 130, the terminals that output SFS1 and a SCLK1, and the terminal that receives SSD1 may be considered a secondary master circuit 114a. The clock divider 128b, the delay circuit 130, the terminals that output SFS2 and SCLK2, and the terminal that receives SSD2 may be considered a secondary master circuit 114b. In this case, the secondary master circuits 114a and 114b share the delay circuit 130. Alternatively, the primary sensor device 104 may include a separate delay circuit 130 for each clock divider 128a/128b.

In one embodiment, the primary sensor device 104 includes the primary slave circuit 112, the digital signal processor 120, and the sensor 122 as described in relation to FIG. 2. In one embodiment, the primary sensor device 104 also includes a shift register 132. The shift register 132 may be one example of a data accumulator 126 of FIG. 2.

The shift register 132 receives the primary clock signal PCLK on a clock input terminal. The shift register 132 also receives the primary sensor data PSD, the secondary sensor data SSD1, and the secondary sensor data SSD2. The shift register outputs the sensor data stream SDS including the sensor data PSD, SSD1, and SSD2 all arranged in a time division-multiplexing scheme in accordance with the clock PCLK.

While FIG. 4 illustrates the primary slave circuit 112 as separate from the shift register 132, in practice, the primary slave circuit 112 may include the shift register 132, the terminals that receive PFS and PCLK, and the terminal the outputs SDS. Various configurations of a primary sensor device 104 and the primary slave circuit 112 can be utilized without departing from the scope of the present disclosure.

Figure 5:
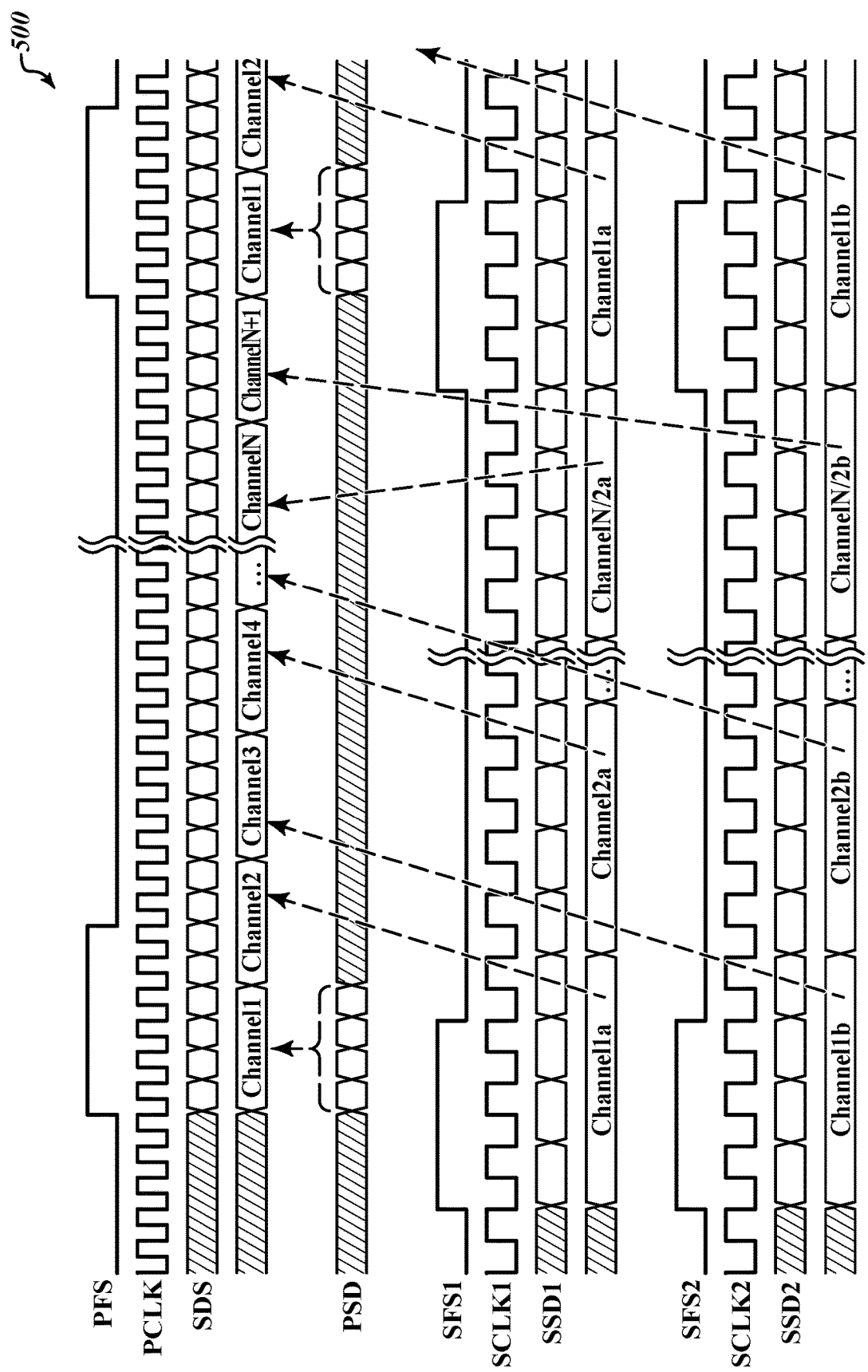
FIG. 5 is a graph illustrating a plurality of signals associated with a sensor system, according to one embodiment.

FIG. 5 is a graph 500 illustrating a plurality of sensor signals associated with a sensor system, in accordance with one embodiment. The example of FIG. 5 corresponds to an embodiment in which there are N+1 sensor devices, where N is the total number of secondary sensor devices 106 and there is one primary sensor device 104. There are two groups 108 of secondary sensor devices. Each group 108 includes N/2 secondary sensor devices. However, in other embodiments, there can be more than two groups 108 of secondary sensor devices 106. In these embodiments, the primary sensor device 104 may include more than two secondary master circuits 114. Furthermore, each group 108 may have different numbers of secondary sensor devices.

FIG. 5 illustrates the primary frame signal PFS, the primary clock signal PCLK, and the sensor data stream SDS. The primary frame signal has a rising edge that indicates the beginning of a new frame. The primary clock signal PCLK is a clock signal substantially corresponding to a square wave. The primary clock signal PCLK is a relatively fast clock signal. The sensor data stream SDS is divided into channels. Each channel carries sensor data from a particular sensor device. Accordingly, there are N+1 channels in each frame.

FIG. 1 illustrates that each channel of the sensor data stream SDS includes four data values or bits. The sensor data stream SDS includes a data value for each cycle of the primary clock signal PCLK. In FIG. 5, each channel has four data values. However, in practice, each channel may have a larger number of data values or a smaller number of data values than shown in FIG. 5.

FIG. 5 illustrates the primary sensor data PSD. The primary sensor data PSD includes the sensor data generated by the sensor 122 of the primary sensor device 104. In FIG. 5, the primary sensor data PSD is included in channel 1 of the sensor data stream SDS. However, in other embodiments, the primary sensor data PSD may be in channels other than the first channel in a frame. For example, the primary sensor data PSD be in a final channel of a frame.

FIG. 5 illustrates signals SFS1, SCLK1, and SSD1 associated with a first group 108a of secondary sensors. The first secondary frame signal SFS1 is delayed relative to the primary frame signal PFS. In the example FIG. 5, the delay is so large that the rising edge of SFS1 is slightly before the rising edge of PFS. As described previously, the secondary clock signal SCLK1 associated with the first group 108a of secondary sensors 106 has a lower frequency than the primary clock signal PCLK. Each data value in SSD1 has a width of one cycle of SCLK1. Each frame associated with SSD1 includes N/2 channels. There is one channel for each secondary sensor 106 in the group 108a of secondary sensors.

FIG. 5 illustrates signals SFS2, SCLK2, and SSD2 associated with a second group 108b of secondary sensors 106. The second secondary frame signal SFS2 is delayed relative to the primary frame signal PFS. In the example FIG. 5, the delay is so large that the rising edge of SFS2 is slightly before the rising edge of PFS. As described previously, the secondary clock signal SCLK2 associated with the first group 108b of secondary sensors 106 has a lower frequency than the primary clock signal PCLK. Each data value in SSD2 has a width of one cycle of SCLK2. Each frame associated with SSD2 includes N/2 channels. There is one channel for each secondary sensor 106 in the group 108a of secondary sensors.

As described previously, the primary sensor device 104 receives SSD1 and SSD2, and generates SDS from SSD1, SSD2 and SDS. The single channel associated with PSD is allocated to the first channel of SDS. Channel 1a of SSD1 is assigned to channel 2 of SDS. Channel 1b of SSD2 is assigned to channel 3 of SDS, and so forth until the data from each channel of SSD1 and SSD2 is placed in SDS. The data from PSD, SSD1, and SSD2 can be arranged into SDS by the data accumulator 126 of FIG. 2.

This scheme provides various benefits. For example, the N secondary sensors can be operated with a relatively slow secondary clock signals. The secondary frames have a same duration as the primary frames, but are delayed relative to the primary frame signal. The result is that timing constraints are loosened and power consumption is reduced.

Figure 6:
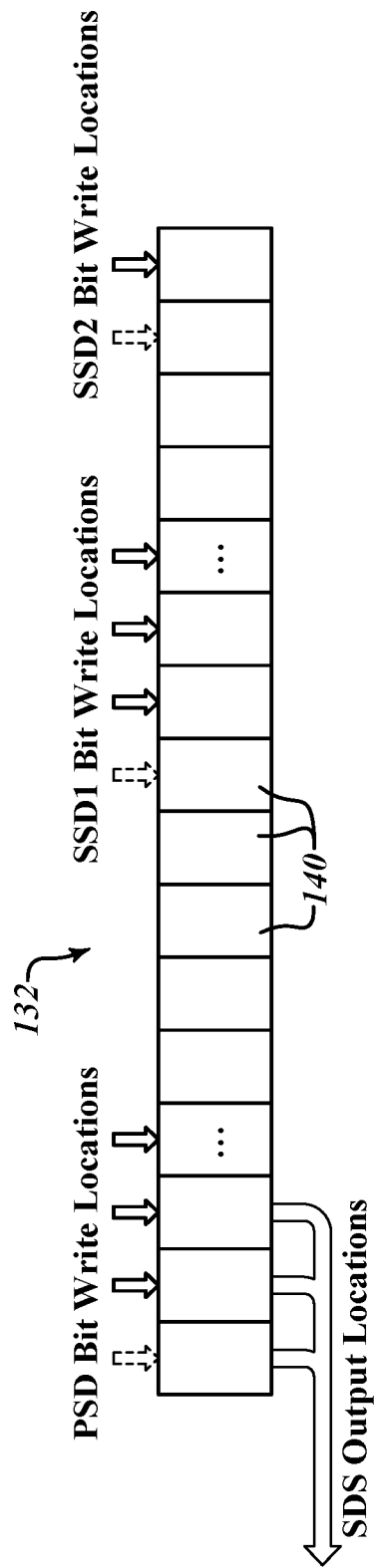
FIG. 6 is a block diagram of a shift register, according to one embodiment.

FIG. 6 illustrates a shift register 132, according to one embodiment. The shift register 132 includes a plurality of data locations 140. The shift register 132 can operate like a first in first out (FIFO) buffer. However, the shift register 132 may operate in an unconventional manner in that data from PSD, SSD1, and SSD2 are inserted at different locations in the shift register 132. Switching devices can selectively enable data values from PSD, SSD1, and SSD2 to be inserted at their particular locations into the shift register. Once data is inserted, the switching devices can temporarily disable PSD, SSD1, and SSD2 from writing data into the shift register 132. The shift register 132 can then output SDS corresponding to a stream of data including channels from each of the primary and secondary sensor devices.

Those of skill in the art will recognize, in light of the present disclosure, that various other schemes can be utilized to accumulated PSD, SSD1, and SSD2 into SDS. These other schemes fall within the scope of the present disclosure.

Figure 7A:
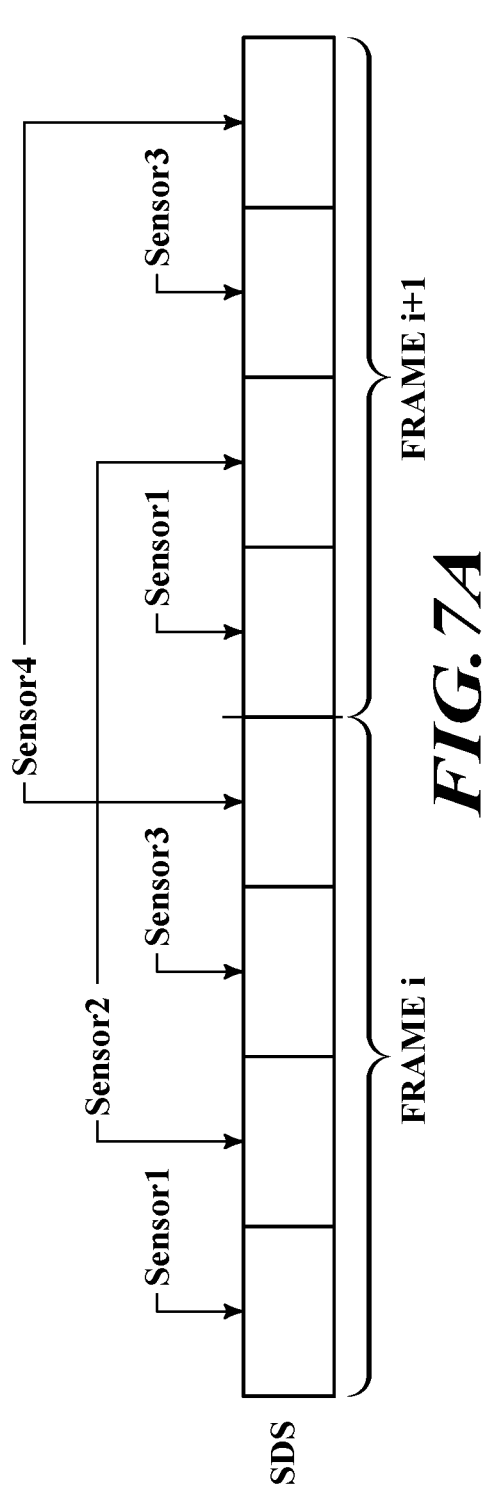
FIGS. 7A and 7B are block diagrams illustrating timings associated with sensor signals, according to one embodiment.

FIG. 7A is a block diagram illustrating two frames of a sensor data stream SDS, according to one embodiment. In the example of FIG. 7A, there are four sensor devices. Accordingly, each frame of SDS includes four channels, one for each sensor device. Sensors 2 and 4 may have slower data rates or may be disabled. Sensor 1 provides data for a first channel in frame i. Sensor 2 provides data for the second channel of frame i. Sensor 3 provides data for the third channel of frame i. Sensor 4 provides data for the fourth channel of frame i. After the fourth channel of frame i, the next frame, frame i+1, begins. Frame i+1 includes four channels, each assigned to a particular sensor. The frames repeat as long as the sensor system is generating sensor data. Accordingly, FIG. 7A illustrates that in one embodiment if there are sensors with different data rates, or if there are sensors that have been disabled, data can be repeated for some of the sensors.

Figure 7B:
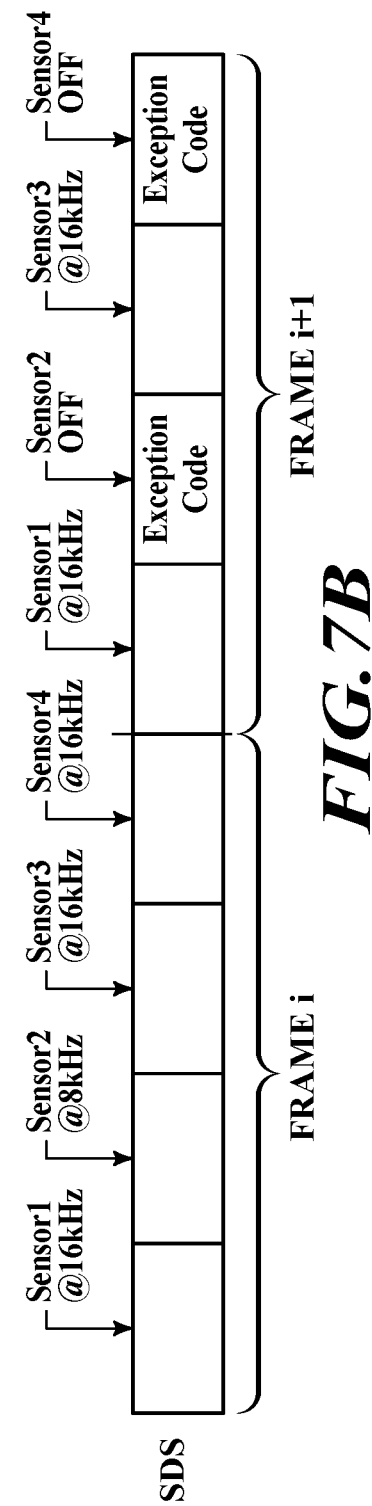

FIG. 7B is a block diagram illustrating two frames of a sensor data stream SDS, according to one embodiment. In the example of FIG. 7B, there are four sensor devices. Accordingly, each frame of SDS includes four channels, one for each sensor device. In the example of FIG. 3, sensors 1 and 3 operate at higher clock speed than sensors 2 and 4. However, a same situation can occur when sensors 2 and 4 have been disabled.

It is not guaranteed that every frame has valid data in each slot. In one embodiment, the solution can include resending the previous data. In one embodiment, a solution is to send an exception code in the slots for which there is no data. This can enable the control circuit to ignore the slots that do not have valid data. This is illustrated in frame i+1 in which the channels assigned to sensor 2 and sensor 4 include an exception code indicating to the control circuit that these channels do not include valid data. Accordingly, FIG. 7B illustrates that in one embodiment if there are sensors with different data rates, or if there are sensors that have been disabled, data can be transmitted as an exception code.

Figure 8:
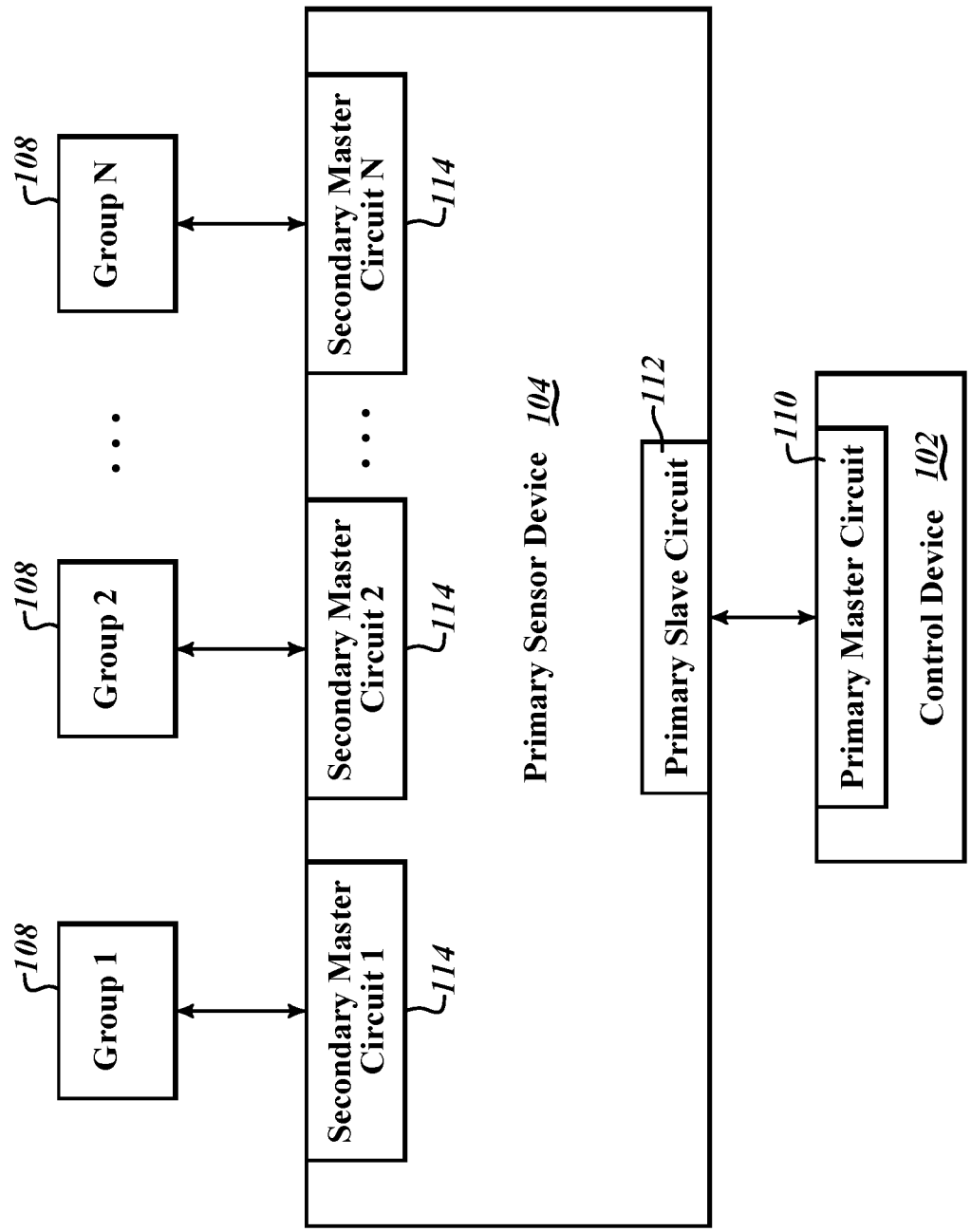
FIG. 8 is a block diagram of a sensor system, according to one embodiment.

FIG. 8 is a block diagram of a sensor system 800, in accordance with some embodiments. The sensor system 800 of FIG. 8 is substantially similar to the sensor system 100 of FIG. 1, except that there are N groups 108 and N secondary master circuits 1. Each group 108 includes one or more secondary sensor devices 108. Each secondary master circuit includes a frequency divider that provides a secondary clock signal to the corresponding group 108. While FIG. 8 shows only a single signal line between each secondary master circuit 114 and the corresponding group 108, in practice there is a signal line for each of the secondary clock signal, secondary frame signal, and secondary data stream, as shown in FIG. 1. Furthermore, each group 108 may include multiple secondary sensor devices or only a single secondary sensor device. The groups 108 may have differing numbers of secondary sensor devices 106.

Figure 9:
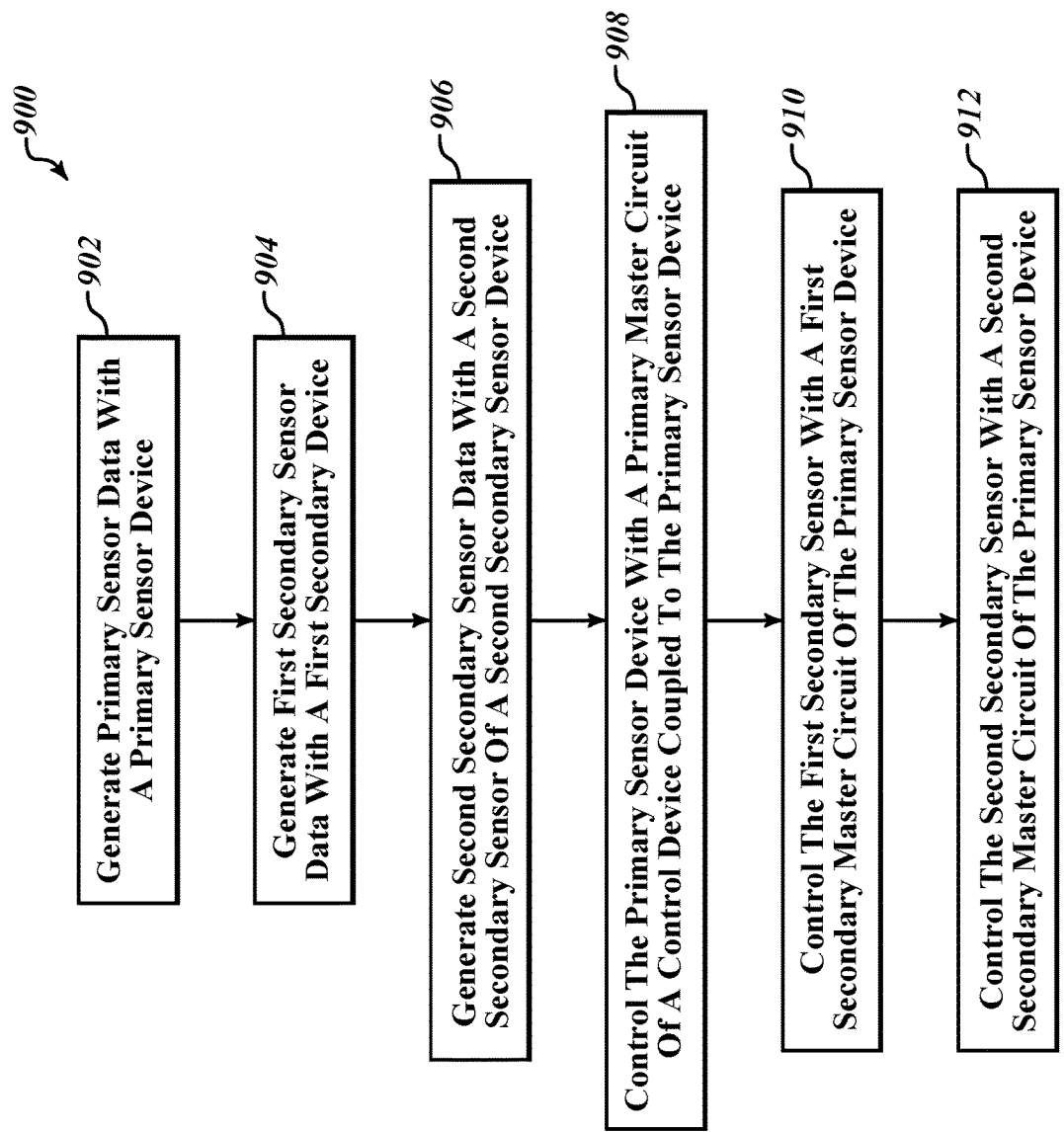
FIG. 9 is a flow diagram of a method for operating a sensor system, according to one embodiment.

FIG. 9 is a flow diagram of a method 900 for operating a sensor system, in accordance with one embodiment. The method 900 may utilize systems, components, and processes described in relation to FIGS. 1-8. At 902, the method 900 includes generating primary sensor data with a primary sensor device. At 904, the method 900 includes generating first secondary sensor data with a first secondary device. At 906, the method 900 includes generating second secondary sensor data with a second secondary sensor of a second secondary sensor device. At 908, the method 900 includes controlling the primary sensor device with a primary master circuit of a control device coupled to the primary sensor device. At 910, the method 900 includes controlling the first secondary sensor with a first secondary master circuit of the primary sensor device. At 912, the method 900 includes controlling the second secondary sensor with a second secondary master circuit of the primary sensor device.

Figure 10:
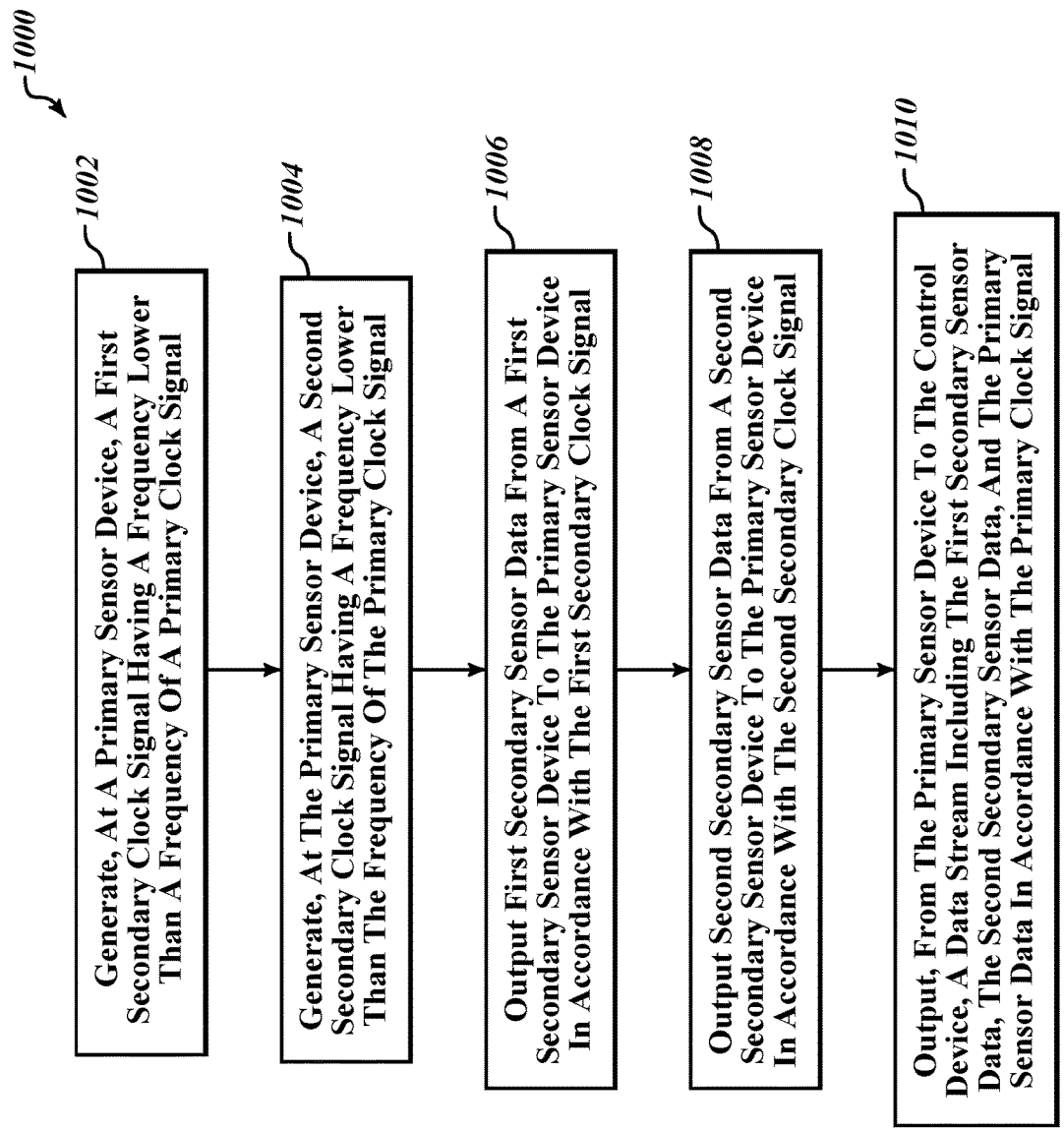
FIG. 10 is a flow diagram of a method for operating a sensor system according to one embodiment.

FIG. 10 is a flow diagram of a method 1000 for operating a sensor system, in accordance with one embodiment. The method 1000 may utilize systems, components, and processes described in relation to FIGS. 1-8. At 1002, the method 1000 includes generating, at a primary sensor device, a first secondary clock signal having a frequency lower than a frequency of a primary clock signal received by the primary sensor device from a control device. At 1004, the method 1000 includes generating, at the primary sensor device, a second secondary clock signal having a frequency lower than the frequency of the primary clock signal. At 1006, the method 1000 includes outputting first secondary sensor data from a first secondary sensor device to the primary sensor device in accordance with the first secondary clock signal. At 1008, the method 1000 includes outputting second secondary sensor data from a second secondary sensor device to the primary sensor device in accordance with the second secondary clock signal. At 1010, the method 1000 includes outputting, from the primary sensor device to the control device, a data stream including the first secondary sensor data, the second secondary sensor data, and the primary sensor data in accordance with the primary clock signal.

In one embodiment, a system includes a plurality of secondary sensor devices each configured to generate secondary sensor data. The system includes a primary sensor device coupled to each of the secondary sensor devices and configured to generate primary sensor data, to receive the secondary sensor data from each of the plurality of secondary sensor devices, and to output a data stream including the primary sensor data and the secondary sensor data from each secondary sensor device. The system includes a control device coupled to the primary sensor device and configured to receive the data stream from the primary sensor.

In one embodiment, a system includes a first secondary sensor device including a first secondary slave circuit and a second secondary sensor device including a second secondary slave circuit. The system includes a primary sensor device including a first secondary master circuit coupled to the first secondary slave circuit, a second secondary master circuit coupled to the second secondary slave circuit, and a primary slave circuit. The system includes a control device including a primary master circuit coupled to the primary slave circuit and the first and second secondary master circuits.

In one embodiment, a method includes generating primary sensor data with a primary sensor device, generating first secondary sensor data with a first secondary device, and generating second secondary sensor data with a second secondary sensor of a second secondary sensor device. The method includes controlling the primary sensor device with a primary master circuit of a control device coupled to the primary sensor device, controlling the first secondary sensor with a first secondary master circuit of the primary sensor device, and controlling the second secondary sensor with a second secondary master circuit of the primary sensor device.

In one embodiment, a method includes receiving, at a primary sensor device, a primary clock signal from a control device, generating, at the primary sensor device, a first secondary clock signal having a frequency lower than a frequency of the primary clock signal, and generating, at the primary sensor device, a second secondary clock signal having a frequency lower than the frequency of the primary clock signal. The method includes outputting first secondary sensor data from a first secondary sensor device to the primary sensor device in accordance with the first secondary clock signal and outputting second secondary sensor data from a second secondary sensor device to the primary sensor device in accordance with the second secondary clock signal. The method includes outputting, from the primary sensor device to the control device, a data stream including the first secondary sensor data, the second secondary sensor data, and the primary sensor data in accordance with the primary clock signal.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
a first secondary sensor device;
a second secondary sensor device; and
a primary sensor device including:
  a primary inertial sensor configured to generate primary inertial sensor signals; and
  a digital signal processor configured to receive the primary inertial sensor signals and to generate primary inertial sensor data from the primary inertial sensor signals, wherein the primary sensor device is configured to receive a primary clock signal, to generate a first secondary clock signal with a frequency lower than a frequency of the primary clock signal, to provide the first secondary clock signal to the first secondary sensor device, to generate a second secondary clock signal with a frequency lower than the frequency of the primary clock signal, and to provide the second secondary clock signal to the second secondary sensor device.

2. The system of claim 1, wherein:
the first and second secondary sensor devices are each configured to generate secondary sensor data; and
the primary sensor device is configured to output a data stream including the primary sensor data and the secondary sensor data from the first and second secondary sensor devices.

3. The system of claim 2, comprising a control device coupled to the primary sensor device and configured to receive the data stream from the primary sensor.

4. The system of claim 2, wherein the primary sensor device generates the data stream in a time division multiplexing scheme.

5. The system of claim 2, wherein the first and second secondary sensor devices each include:
  a secondary sensor configured to generate secondary sensor signals;
  a secondary signal processor configured to generate the secondary sensor data from the secondary sensor signals; and
  a secondary data output circuitry configured to output the secondary sensor data to the primary sensor.

6. The system of claim 5, wherein the primary sensor device includes a secondary data output circuitry configured to output the primary sensor data.

7. The system of claim 6, wherein the primary sensor device includes data accumulation circuitry configured to receive the primary sensor data, to receive the secondary sensor data from all of the secondary sensor devices, and to data stream in a time division multiplexing scheme.

8. The system of claim 2, wherein the primary sensor device includes:
  a first clock divider configured to receive a primary clock signal from a control device and to generate the first secondary clock signal; and
  a second clock divider configured to receive the primary clock signal and to generate the second secondary clock signal.

9. The system of claim 8, including:
  a first secondary data line coupled to the primary sensor device, wherein the first secondary sensor device provides the first secondary sensor data to the primary sensor device on the first secondary data line in accordance with the first secondary clock signal;
  a second secondary data line coupled to the primary sensor device, wherein the second secondary sensor device provides the second secondary sensor data to the primary sensor device on the second secondary data one in accordance with the second secondary clock signal; and
  a primary data line coupled between the control device and the primary sensor device, wherein the primary sensor device outputs the data stream to the control device on the primary data line in accordance with the primary clock signal.

10. The system of claim 9, wherein:
the control device provides a primary frame sync signal to the primary sensor device, the primary sensor device provides the primary sensor data to the data stream in accordance with a primary frame sync signal;
the primary sensor device generates a secondary frame signal based on the primary frame signal and provides the secondary frame sync signal to the first and second secondary sensor devices; and
the first and second secondary sensor devices output the first and second secondary sensor data, respectively, to the primary sensor device in accordance with the secondary frame signal.

11. The system of claim 10, wherein the primary sensor device includes a shift register configured to receive the primary sensor data, to receive the secondary sensor data from the first and second secondary sensor devices, and to output the data stream.

12. A system, comprising:
    a primary sensor device configured to generate primary sensor data in accordance with a primary clock signal, the primary sensor device including:
        a clock divider configured to receive the primary clock signal and to generate a secondary clock signal with a frequency lower than a frequency of the primary clock signal; and
        a shift register configured to receive the primary clock signal, to receive the primary sensor data, to receive secondary sensor data generated by a secondary sensor device in accordance with the secondary clock signal, and to output a data stream including the primary sensor data and the secondary sensor data in accordance with the primary clock signal.

13. The system of claim 12, wherein the shift register receives the primary clock signal and shifts data values on each cycle of the primary clock signal.

14. The system of claim 12, wherein the shift register includes a plurality of data locations, wherein primary sensor data is inserted into the shift register at a plurality of first data locations of the plurality of data locations, wherein the secondary sensor data is inserted into the shift register a plurality of second write locations of the plurality of data locations different from the first data locations.

15. The system of claim 14, wherein the shift register is periodically disabled from receiving new data values at the first data locations and the second data locations.

16. The system of claim 15, comprising a plurality of switching devices that selectively enable inserting the primary sensor data into the first data locations and the secondary sensor data into the second data locations.

17. A method, comprising:
    generating, with a primary sensor device, primary sensor data in accordance with a primary clock signal;
    receiving, with a clock divider of the primary sensor device, a secondary clock signal with a frequency lower than a frequency of the primary clock signal,
    receiving, with a shift register of the primary sensor device, the primary sensor data and secondary sensor data generated by a secondary sensor device in accordance with the secondary clock signal; and
    outputting, with the shift register, a data stream including the primary sensor data and the secondary sensor data in accordance with the primary clock signal.

18. The method of claim 17, comprising:
    receiving the primary clock signal with the shift register; and
    shifting, with the shift register, data values on each cycle of the primary clock signal.

19. The method of claim 17, comprising:
    inserting the primary sensor data into a plurality of first data locations of a plurality of data locations of the shift register; and
    inserting the secondary sensor data into a plurality of second data locations of the plurality of data locations of the shift register different than the first data locations.

20. The method of claim 19, comprising periodically disabling the shift register from receiving new data values at the first data locations and the second data locations.

* * * * *